(12) United States Patent
Ono et al.

(10) Patent No.: US 8,733,496 B2
(45) Date of Patent: May 27, 2014

(54) ACOUSTIC DAMPER, COMBUSTOR, AND GAS TURBINE

(75) Inventors: Masaki Ono, Tokyo (JP); Tetsu Konishi, Tokyo (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 13/876,772

(22) PCT Filed: Feb. 20, 2012

(86) PCT No.: PCT/JP2012/053988
§ 371 (c)(1),
(2), (4) Date: Mar. 28, 2013

(87) PCT Pub. No.: WO2012/127959
PCT Pub. Date: Sep. 27, 2012

(65) Prior Publication Data
US 2013/0206500 A1 Aug. 15, 2013

(30) Foreign Application Priority Data
Mar. 22, 2011 (JP) ................................. 2011-063298

(51) Int. Cl.
*F02K 1/82* (2006.01)
*F01N 1/02* (2006.01)
*F02K 1/00* (2006.01)
*F01N 1/00* (2006.01)

(52) U.S. Cl.
USPC ......................................... 181/213; 181/250

(58) Field of Classification Search
USPC .......................... 181/213, 214, 250, 273, 276
See application file for complete search history.

(56) References Cited

U.S. PATENT DOCUMENTS

| 3,655,011 | A | * | 4/1972 | Willett | 181/276 |
| 4,944,362 | A | * | 7/1990 | Motsinger et al. | 181/213 |
| 5,502,283 | A | * | 3/1996 | Ukai et al. | 181/228 |
| 6,508,331 | B1 | * | 1/2003 | Stuart | 181/250 |

(Continued)

FOREIGN PATENT DOCUMENTS

| JP | 62126215 A | * | 6/1987 | ................ F01N 1/02 |
| JP | 2006-22966 A | | 1/2006 | |

(Continued)

OTHER PUBLICATIONS

International Search Report for PCT/JP2012/053988, mailing date of Apr. 17, 2012.

(Continued)

*Primary Examiner* — Edgardo San Martin
(74) *Attorney, Agent, or Firm* — Westerman, Hattori, Daniels & Adrian, LLP

(57) ABSTRACT

An acoustic damper is fixed to a vibration source to be provided along an outer surface of the vibration source, forms a passage that takes in air vibration generated by the vibration source, and is provided with an acoustic portion having a partition member closing the downstream side of the passage with respect to the propagation of the air vibration to serve as resistance against the air vibration, in which the acoustic portion allows air vibration to propagate in a reverse direction, and has partition members arranged so as to serve as resistance against the air vibration in respective directions. This allows to prevent from generating stress due to pressure fluctuation caused when reducing vibration, and to achieve a relatively compact size.

10 Claims, 8 Drawing Sheets

(56) References Cited

U.S. PATENT DOCUMENTS

| | | | |
|---|---|---|---|
| 6,595,319 B1 * | 7/2003 | Huff | 181/250 |
| 6,640,544 B2 * | 11/2003 | Suenaga et al. | 60/725 |
| 6,973,790 B2 * | 12/2005 | Suenaga et al. | 60/725 |
| 7,194,862 B2 * | 3/2007 | Sattinger | 60/725 |
| 7,461,719 B2 * | 12/2008 | Tobik et al. | 181/213 |
| 7,798,286 B2 * | 9/2010 | Skowronski et al. | 181/266 |
| 7,832,211 B2 * | 11/2010 | Ikeda et al. | 60/725 |
| 8,490,744 B2 * | 7/2013 | Nakamura et al. | 181/213 |
| 2002/0152740 A1 | 10/2002 | Suenaga et al. | |
| 2005/0034918 A1 * | 2/2005 | Bland et al. | 181/250 |
| 2005/0223707 A1 * | 10/2005 | Ikeda et al. | 60/725 |

FOREIGN PATENT DOCUMENTS

| | | | |
|---|---|---|---|
| JP | 2006-266671 A | | 10/2006 |
| JP | 2008020095 A | * | 1/2008 |
| JP | 2008-291978 A | | 12/2008 |
| JP | 2009144975 A | * | 7/2009 |
| WO | 2009/066706 A1 | | 5/2009 |
| WO | 2010/097982 A1 | | 9/2010 |

OTHER PUBLICATIONS

Written Opinion of the International Searching Authority for PCT/JP2012/053988, mailing date of Apr. 17, 2012.

* cited by examiner

ACOUSTIC DAMPER, COMBUSTOR, AND GAS TURBINE

FIELD

The present invention relates to an acoustic damper, a combustor, and a gas turbine.

BACKGROUND

In the related art, for example, in Patent Literature 1, in order to reduce vibration in a wide frequency band, an acoustic damper including a pipe line with a passage and including a resistor which applies resistance to a fluid flowing in the pipe line is disclosed. In the acoustic damper, the bent and small-sized pipe line and resistor are mounted on a bypass pipe mounted on a combustion chamber of a combustor, and the inside of the bypass pipe communicates with the inside of the pipe line through the passage of the pipe line.

In addition, in the related art, for example, in Patent Literature 2, in order to improve a damping performance and maintenance workability, a damping device including an acoustic liner including an acoustic liner resonance space including a porous plate and a housing, and an acoustic damper connected to the housing and including an acoustic damper resonance space communicating with the acoustic liner resonance space therein is disclosed. In the damping device, the acoustic liner is mounted in the vicinity of a transition piece of a combustor, and the acoustic damper is provided along an extending direction of the transition piece.

CITATION LIST

Patent Literature

Patent Literature 1: Japanese Patent Laid-open No. 2006-22966
Patent Literature 2: Japanese Patent Laid-open No. 2006-266671

SUMMARY

Technical Problem

However, the acoustic damper is a kind of resonance box, and thus large pressure fluctuation occurs in the acoustic damper. When large stress occurs in the combustor by the pressure fluctuation, the combustor may be damaged. For this reason, in order not to transfer the large stress to the combustor, a configuration is necessary in which the acoustic damper and the combustor are not fixed to each other. For this reason, by separating the acoustic damper from the combustor, an installation space of the acoustic damper with respect to the combustor be comes wider, and there may be a case in which a space for installing the acoustic damper is not secured in a very small-sized combustor.

The present invention has been made to solve the problem described above, an object of the invention is to provide an acoustic damper, a combustor, and a gas turbine capable of preventing generation of stress due to pressure fluctuation caused when reducing vibration and of achieving a relatively compact configuration.

Solution to Problem

According to an aspect of the present invention in order to achieve the object, there is provided an acoustic damper including: an acoustic portion that is fixed to a vibration source to be provided along an outer surface of the vibration source, forms a passage that takes in air vibration generated by the vibration source, and includes a partition member closing the downstream side of the passage with respect to the propagation of the air vibration to serve as resistance against the air vibration, wherein the acoustic portion allows the air vibration to propagate in a reverse direction, and has the partition member arranged so as to serve as resistance against the air vibration in respective directions.

According to the acoustic damper, the pressure fluctuation in the vibration source is reduced by the acoustic portion. In addition, the exciting force generated by collision of the air vibration to the partition member when reducing the pressure fluctuation is suppressed with each other by each partition member serving as resistance of the air vibration in the reverse direction, and thus it is possible to prevent from generating stress due to the pressure fluctuation when reducing the vibration. In addition, since the acoustic portion is provided along the outer surface of the vibration source, it is possible to achieve a relatively compact configuration.

In the acoustic damper of the present invention, it is characterized that the acoustic portion is provided in which the passage is folded in the reverse direction, and the partition member is provided at the folded portion and an end portion.

According to the acoustic damper, the pressure fluctuation in the vibration source is reduced by the acoustic portion. In addition, the exciting force generated by collision of the air vibration to the partition member when reducing the pressure fluctuation is suppressed with each other by each partition member serving as resistance of the air vibration in the reverse direction, and thus it is possible to prevent from generating stress due to the pressure fluctuation when reducing the vibration. In addition, the acoustic portion is provided along the outer surface of the vibration source, the passage is provided to be folded, and thus it is possible to achieve a relatively compact configuration.

In the acoustic damper of the present invention, it is characterized that a plurality of the acoustic portions configured by folding the passage are disposed.

According to the acoustic damper, the pressure fluctuation in the vibration source is reduced by the acoustic portion. In addition, the exciting force generated by collision of the air vibration to the partition member when reducing the pressure fluctuation is suppressed with each other by each partition member serving as resistance of the air vibration in the reverse direction, and thus it is possible to prevent from generating stress due to the pressure fluctuation when reducing the vibration. In addition, the acoustic portion is provided along the outer surface of the vibration source, the passage is provided to be folded, and thus it is possible to achieve a relatively compact configuration. In addition, a plurality of acoustic portions is provided, and thus it is possible to reduce the vibration according to a plurality of frequencies of the air vibration.

In the acoustic damper of the present invention, it is characterized that the folding of the passage is performed a plurality of times, and the partition member is provided at each folded portion.

According to the acoustic damper, the pressure fluctuation in the vibration source is reduced by the acoustic portion. In addition, the exciting force generated by collision of the air vibration to the partition member when reducing the pressure fluctuation is suppressed with each other by each partition member serving as resistance of the air vibration in the reverse direction, and thus it is possible to prevent from generating stress due to the pressure fluctuation when reducing the vibration. In addition, the acoustic portion is provided along the outer surface of the vibration source, the passage is provided to be folded, and thus it is possible to achieve a relatively compact configuration.

According to another aspect of the present invention in order to achieve the object, there is provided a combustor in which a combustion chamber is provided with the acoustic damper according to the above aspect and air vibration of combustion gas flowing in the combustion chamber is allowed to flow in the acoustic damper.

According to the combustor, the pressure fluctuation in the combustor caused by combustion vibration is reduced by the acoustic portion. In addition, the exciting force generated by collision of the air vibration to the partition member when reducing the pressure fluctuation is suppressed with each other by each partition member serving as resistance of the air vibration in the reverse direction, and thus it is possible to prevent from generating stress on the combustor due to the pressure fluctuation when reducing the vibration. In addition, the acoustic portion is provided along the outer surface of the combustion chamber, and thus it is possible to achieve a relatively compact configuration of the combustor.

In the combustor of the present invention, it is characterized that the passage is disposed along a circumferential direction of the combustion chamber.

According to the combustor, it is possible to prevent from generating vibration displaced in the circumferential direction of the combustion chamber.

In the combustor of the present invention, it is characterized that the passage is disposed along an axial direction of the combustion chamber.

According to the combustor, it is possible to prevent from generating vibration displaced in the axial direction of the combustion chamber.

According to still another aspect of the present invention in order to achieve the object, there is provided a gas turbine including the combustor according to the another aspect.

According to the gas turbine, the combustion vibration generated in the combustor is reduced by the acoustic portion. For this reason, it is possible to reduce noise and vibration when driving the gas turbine. In addition, the exciting force generated by collision of the air vibration to the partition member when reducing the combustion vibration is suppressed with each other by each partition member serving as resistance of the air vibration in the reverse direction, it is possible to prevent from generating stress on the combustor due to the pressure fluctuation when reducing the vibration, and thus it is possible to prevent from generating stress on the gas turbine. In addition, the acoustic portion is provided along the outer surface of the combustion chamber, and thus it is possible to achieve a relatively compact configuration of the gas turbine with the combustor.

Advantageous Effects of Invention

According to the invention, it is possible to prevent from generating stress due to pressure fluctuation caused when reducing vibration, and to achieve a relatively compact configuration.

DESCRIPTION OF EMBODIMENTS

Hereinafter, an embodiment according to the invention will be described in detail with reference to the drawings. In addition, the invention is not limited to the embodiment. In addition, constituent elements in the embodiment to be described below include substantially the same elements of the elements which are replaceable and easy to understand by a personskilled in the art.

Figure 1:
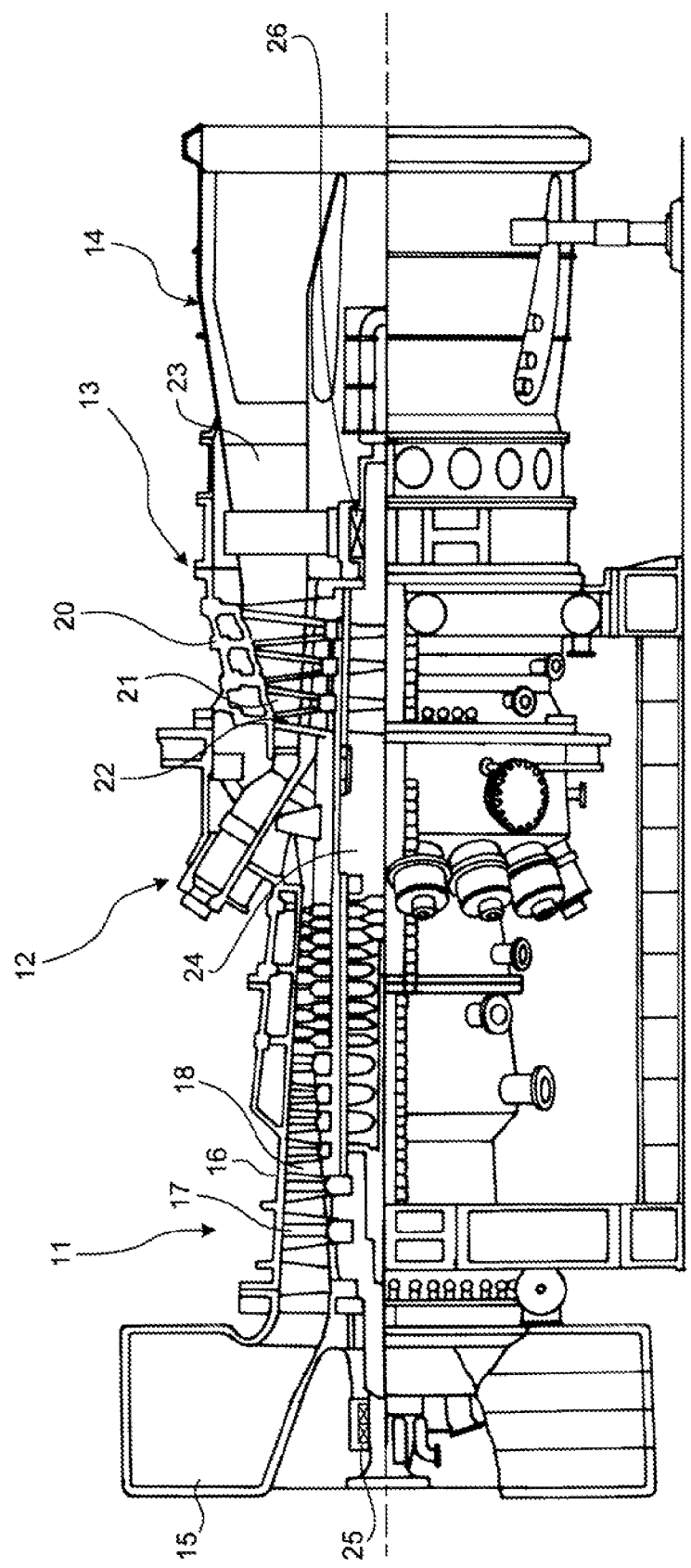
FIG. 1 is a schematic diagram illustrating a configuration of a gas turbine according to an embodiment of the invention.

FIG. 1 is a schematic diagram illustrating a configuration of a gas turbine according to the embodiment. As illustrated in FIG. 1, the gas turbine includes a compressor 11, a combustor 12, a turbine 13, and a flue chamber 14, and the compressor 11 is connected to a generator (not illustrated). The compressor 11 includes an air inlet 15 which brings the air in, and a plurality of vanes 17 and blades 18 are alternately provided in a compressor cylinder 16. The combustor 12 supplies fuel to the air compressed by the compressor 11, which is ignited by a burner to allow combustion. In the turbine 13, a plurality of vanes 21 and blades 22 are alternately provided in a turbine cylinder 20. The flue chamber 14 includes a flue diffuser 23 continuous to the turbine 13. In addition, a rotor 24 is positioned to penetrate the center of the compressor 11, the combustor 12, the turbine 13, and the flue chamber 14, an end portion on the compressor 11 side is rotatably supported by a bearing portion 25, an end portion on the flue chamber 14 side is rotatably supported by a bearing portion 26. A plurality of disc plates are fixed to the rotor 24, and are connected to the blades 18 and 22, and a driving shaft of an electric generator (not illustrated) is connected to an end portion on the compressor 11 side.

Accordingly, the air received from the air inlet 15 of the compressor 11 passes through the plurality of vanes 17 and blades 18 and is compressed to be high-temperature and high-pressure compressed air, and predetermined fuel is supplied to the compressed air and is burned in the combustor 12. The high-temperature and high-pressure combustion gas that is operation fluid generated by the combustor 12 passes through the plurality of vanes 21 and blades 22 constituting the turbine 13 to drive and rotate the rotor 24 and drive the electric generator connected to the rotor 24, and the flue gas is discharged to the air after conversion to positive pressure with the flue diffuser 23 of the flue chamber 14.

Figure 2:
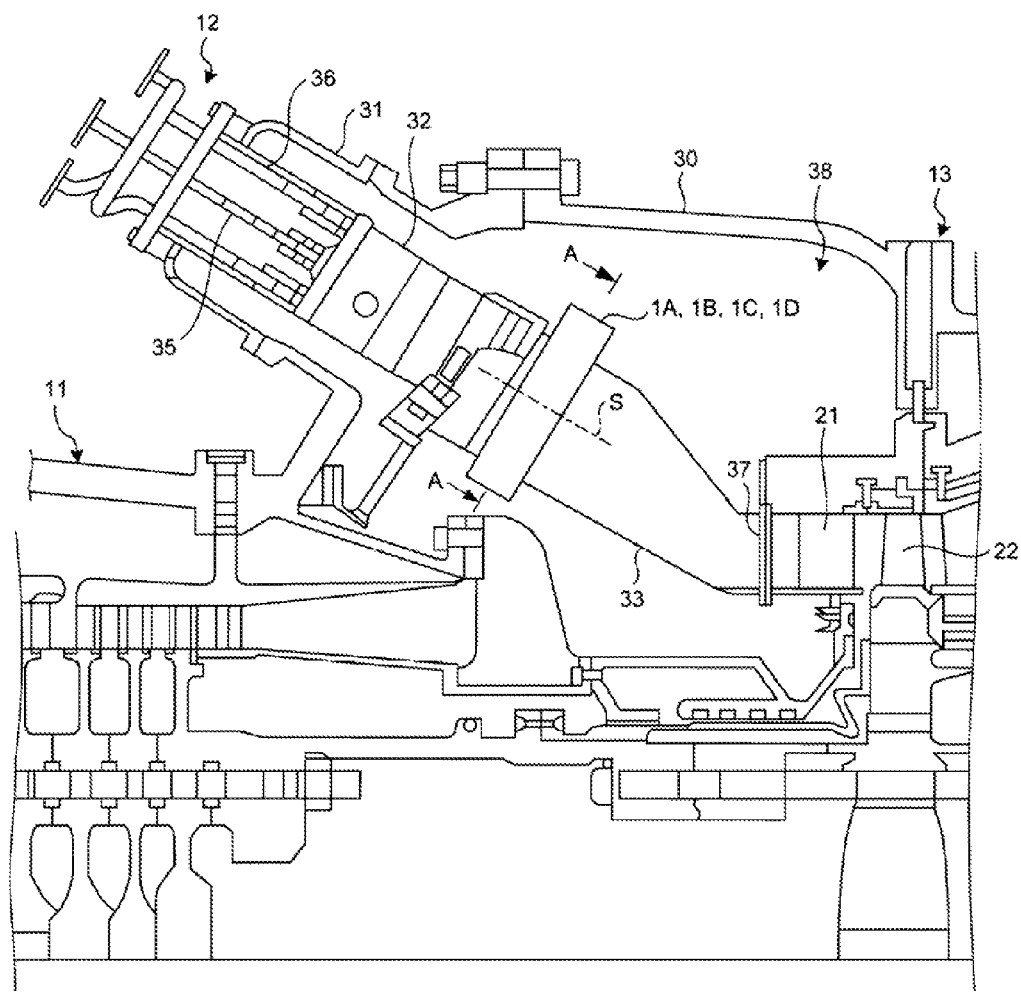
FIG. 2 is a side view of a combustor according to the embodiment of the invention.

FIG. 2 is a side view of the combustor according to the embodiment. An inner cylinder 32 of the combustor 12 is supported by the inside of a cylinder housing 30 and an outer cylinder 31, a leading end of the inner cylinder 32 is connected to a transition piece 33 as the combustion chamber.

The outer cylinder 31 is assembled with the cylinder housing 30. The inner cylinder 32 is provided at a distance from the inside of the outer cylinder 31 to the outer cylinder 31, a pilot nozzle 35 is provided along an axial direction that is an extending direction of a combustor axis S in the center portion therein. In addition, in the inner cylinder 32, a plurality of main nozzles 36 are provided in parallel to the combustor axis S to surround the pilot nozzle 35 along a circumferential direction on the inner circumferential face therein. In the transition piece 33, a base end is cylindrically formed and is connected to the leading end of the inner cylinder 32, is curved and deformed while a cross section becomes smaller toward the leading end side, and the leading end is formed to be substantially rectangular and is opened toward the vane 21 at the first-stage of the turbine 13, and is assembled with the cylinder housing 30 through a gusset 37. The inside of the transition piece 33 is configured as a combustion room. In addition, the inside of the cylinder housing 30 is formed, as a cylinder 38, and the transition piece 33 is provided in the cylinder 38.

In the combustor 12, the high-temperature and high-pressure air from the compressor 11 flows from the base end side of the inner cylinder 32 into the inner cylinder 32 through the cylinder 38. The compressed air is induced to the pilot nozzle 35 and the main nozzle 36. The compressed air is mixed with fuel ejected from the main nozzle 36 to be premised gas, and the gas flows into the transition piece 33. In addition, the compressed air is mixed with fuel ejected from the pilot nozzle 35, is ignited and burned by pilot light (not illustrated) to be combustion gas, and the gas is ejected into the transition piece 33. In this case, a part of the flue gas is ejected to be diffused around with a flame in the transition piece 33, and is ignited and burned in the premixed gas flowing from the main nozzles 36 into the transition piece 33. That is, by the diffusion flame based on the pilot fuel ejected from the pilot nozzle 35, it is possible to perform flame holding for stable combustion of the dilute premixed fuel from the main nozzles 36. In addition, the fuel is premixed by the main nozzle 36 to make fuel concentration uniform, and thus it is possible to achieve lowering NOx. The flue gas is supplied to the turbine 13 through the transition piece 33.

Figure 3:
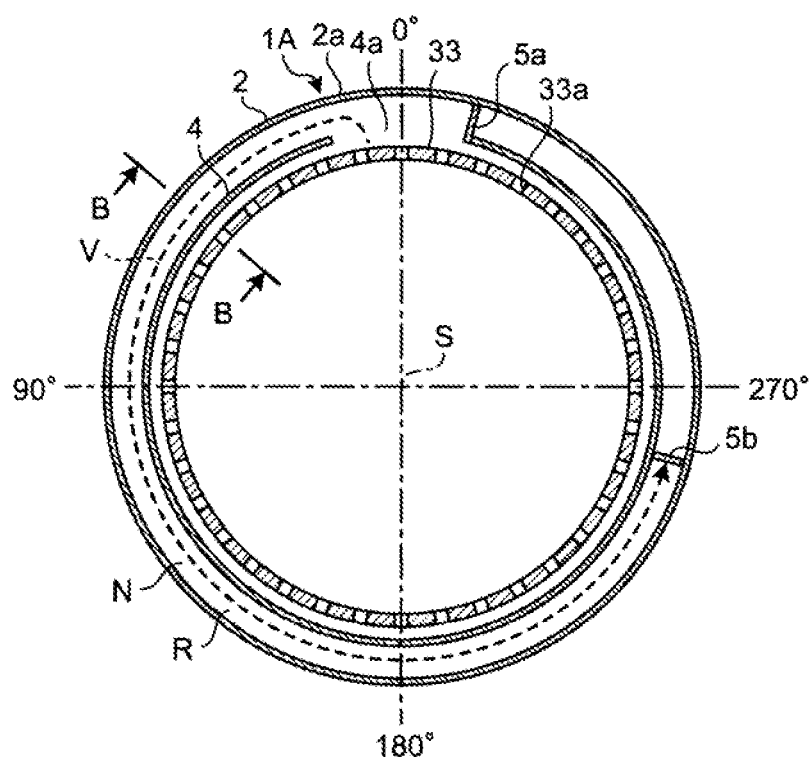
FIG. 3 is a cross-sectional view illustrating an acoustic damper taken along the line A-A of FIG. 2 according to the embodiment of the invention.
Figure 4:
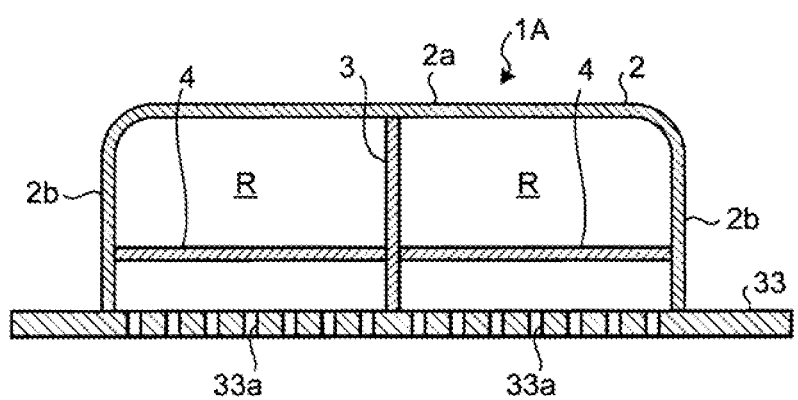
FIG. 4 is a cross-sectional view taken along the line B-B of FIG. 3.
Figure 5:
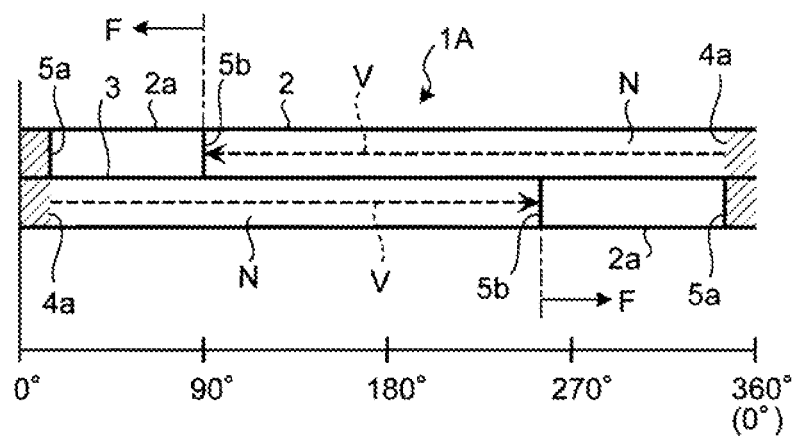
FIG. 5 is a schematic diagram illustrating that the acoustic damper is developed in a circumferential direction.

FIG. 3 is a cross-sectional view taken along the line A-A of FIG. 2 illustrating an acoustic damper according to the embodiment, FIG. 4 is a cross-sectional view taken along the line B-B of FIG. 3, and FIG. 5 is a schematic diagram illustrating that the acoustic damper is developed in a circumferential direction.

In the combustor 12 of the gas turbine described above, vibration (combustion vibration) occurs when the fuel is burned. The combustion vibration causes noise or vibration when driving the gas turbine. Therein, the combustor 12 (the transition piece 33) as the vibration source in which the flue gas flows is provided with an acoustic damper 1A.

In FIG. 2, the acoustic damper 1A is provided along the circumferential direction on the outer surface on the base end side of the transition piece 33 in the combustor 12. As illustrated in FIG. 3 and FIG. 4, the acoustic damper 1A includes a housing 2 surrounding the outside of the transition piece 33 as the vibration source. The housing 2 includes a cylindrical outer wall portion 2a surrounding the outside of the transition piece 33 in the circumferential direction, and a side wall portion 2b fixed to the transition piece 33 while closing both openings of the outer wall portion 2a, and forms an annular space on the outside of the transition piece 33. In the transition piece 33, a plurality of through-holes 33a allowing air vibration (pressure wave) V based on the combustion vibration in the transition piece 33 to pass to the outside of the transition piece 33 are formed in the circumferential direction of the transition piece 33, at the portion where the housing 2 is provided.

In addition, the acoustic damper 1A includes a compartment wall 3 that partitions the space of the housing 2 in the axial direction along the outer wall portion 2a, in the housing 2. In addition, in the housing 2, the acoustic damper 1A includes a partition wall 4 that partitions the space partitioned by the compartment wall 3 into the inside and the outside in the space of the housing 2. That is, the partition wall 4 is provided between the outer wall portion 2a of the housing 2 and the outer surface of the transition piece 33. In addition, as illustrated in FIG. 3, the partition wall 4 is provided with a notch 4a communicating with the space of the housing 2 partitioned into the inside and the outside at a part of the circumferential direction. One end of the partition wall 4 notched by the notch 4a in the circumferential direction is provided with a partition member 5a closing the cater space of the housing 2. For this reason, the inner space of the housing 2 communicates with the inside of the transition piece 33 through the through-hole 33a of the transition piece 33, the outer space of the housing 2 is provided with an inlet communicating with the inner space of the housing 2 by the notch 4a, and an end portion taken along the circumferential direction forms a passage R blocked by the partition member 5a. In addition, although each passage R is formed in the space of the housing 2 partitioned in the axial direction by the compartment wall 3, as illustrated in FIG. 5, a configuration is achieved in which the inlet based on the notch 4a and the end portion blocked by the partition member 5a are inverted.

In addition, in the acoustic damper 1A described above, one housing 2 is partitioned in the axial direction by the compartment wall 3 to configure two passages R, but two passages R may be configured by two housings 2 without providing the compartment wall 3.

In addition, a partition member 5b is provided in the middle between the inlet and the end portion of each passage R. The partition member 5b blocks the middle of the passage R. In the passage R, the space between the inlet thereof and the partition member 5b is configured as an acoustic portion N that reduces pressure fluctuation in the combustor 12 in the passage R. In two passages R, the acoustic portion N is configured in which the positions of the inlet and the partition member 5b in the circumferential direction are inverted.

In the acoustic damper 1A configured as described above, as illustrated in FIG. 3, when the fuel gas flows in the transition piece 33, the air vibration (the pressure wave) V based on the combustion vibration of the combustion gas passes through the through-hole 33a of the transition piece 33 and is received in the housing 2. In the passage R, at the acoustic portion N between the inlet thereof and the partition member 5b, the air vibration V propagating from the inlet resonates, and the pressure fluctuation in the combustor 12 is reduced. In addition, as illustrated in FIG. 5, in two passages R, the position in the circumferential direction between the inlet of each acoustic portion N and the partition member 5b is inverted, and thus the propagation direction of the air vibration V becomes the reverse direction.

Figure 6:
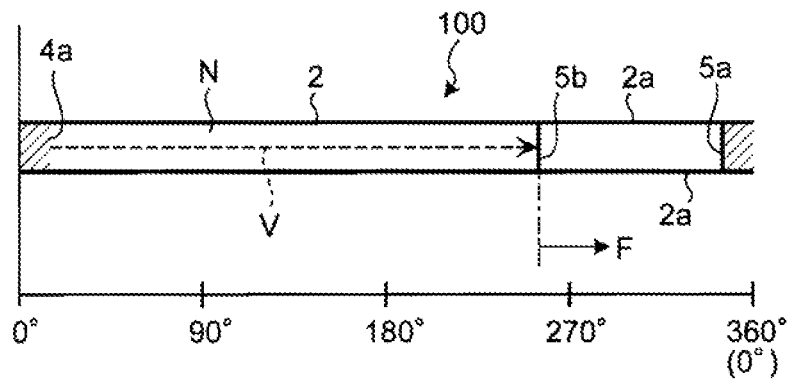
FIG. 6 is a schematic diagram illustrating that an acoustic damper compared with the acoustic damper according to the embodiment of the invention is developed in the circumferential direction.
Figure 7:
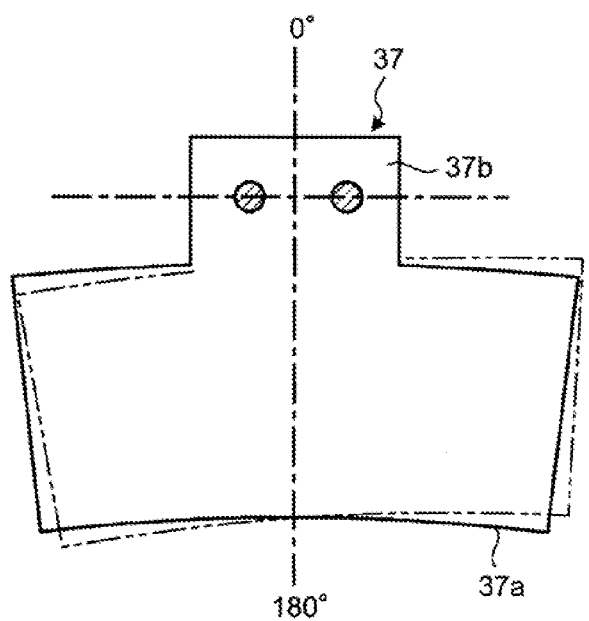
FIG. 7 is a diagram illustrating an influence based on the acoustic damper of FIG. 6.
Figure 8:
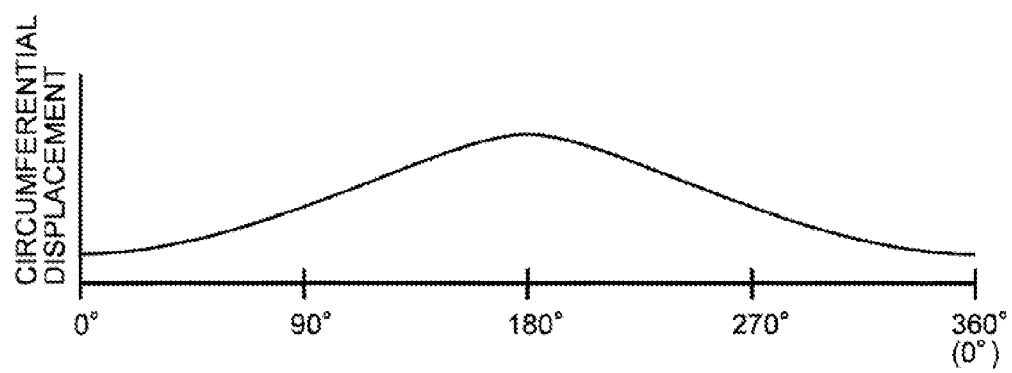
FIG. 8 is a diagram illustrating an influence based on the acoustic damper of FIG. 6.

Herein, FIG. 6 is a schematic diagram illustrating that an acoustic damper compared with the acoustic damper according to the embodiment is developed in the circumferential direction, and FIG. 7 and FIG. 8 are diagrams illustrating an influence based on the acoustic damper of FIG. 6.

In a acoustic damper 100 illustrated in FIG. 6, the number of an acoustic portion N of the acoustic damper 1A described is set to one. In the acoustic damper 100 with such a configuration, in pressure fluctuation in the acoustic portion N, acoustic pressure of the inlet portion is low, and is the maximum at the partition member 5b. Meanwhile, between the partition member 5b and the partition member 5a, there is no propagation of the air vibration V, and acoustic pressure does not occur previously. In addition, the partition member 5a is positioned at the inlet portion, and thus there is no large pressure fluctuation therein. For this reason, the partition member 5b is subjected to very large pressure fluctuation on one face thereof, and is not subjected to the pressure fluctuation on the other face. As a result, since the acoustic damper 100 is subjected to the large pressure fluctuation on the face of the inlet side of the partition member 5b, exciting force F toward the other face side of the partition member 5b in FIG. 6 occurs. That is, the exciting force F in the circumferential direction occurs.

Generally, the magnitude of the exciting force F in any vibration mode is represented by the following formula (1).

$$F = \int (fr \times dr + f\theta \times d\theta + fz \times dz) \quad (1)$$

In the formula (1), fr denotes force of a radial direction component, fθ denotes force of a circumferential direction component, fz denotes force of an axial direction component, dr denotes vibration displacement in a radial direction, dθ denotes vibration displacement in a circumferential direction, and dz denotes vibration displacement in an axial direction.

For example, in the combustor 12 of the gas turbine described above, the leading end of the transition piece 33 is assembled with the cylinder housing 30 through the gusset 37. In the gusset 37, a support piece 37b extends above a substantially rectangular frame portion 37a of the leading end or the transition piece 33, and the support piece 37b is assembled with the cylinder housing 30. In such a transition piece 33, when the exciting force F in the circumferential direction described above occurs, vibration in which the exciting force F rotates in the circumferential direction based on the assembled portion of the support piece 37b as a base point occurs. As a result, as illustrated in FIG. 7, when the assembled portion of the support piece 37b is 0° and the bottom side of the frame portion 37a is 180°, as illustrated in FIG. 8, in the circumferential displacement of the transition piece 33, the 0° position supported by the gusset 37 is relatively slightly displaced, and the 180° position is drastically displaced.

Meanwhile, in the acoustic damper 1A of the embodiment, the position of each acoustic portion N in the circumferential direction with respect to the inlet thereof and the partition member 5b is inverted, and the propagation direction of the air vibration V is the reverse direction. For this reason, as illustrated in FIG. 5, the exciting force F occurring at the position of each partition member 5b acts in the reverse direction with respect to each other. As a result, in the transition piece 33 of the combustor 12, the displacement occurring in the circumferential direction is suppressed.

The position of the partition member 5b in the circumferential direction is a gap between the partition member 5b and the inlet, and determines the length of the acoustic portion N. The length of the acoustic portion N is a distance for resonating the propagating air vibration V, and the distance is determined according to the frequency of the propagating air vibration V. That is, the position of the partition member 5b in the circumferential direction is determined according to the frequency of the air vibration V that is a reducing target. In addition, since the acoustic pressure applied to the partition member 5b by the position of the acoustic portion N in the axial direction is different, the position of the partition member 5b in the circumferential direction is determined also considering the position of the acoustic portion N in the axial direction. In addition, when there is a possibility that each air vibration V reduced by each acoustic portion N resonates, the position of the partition member 5b is determined also considering the possibility. The air vibration V and the transfer of the air vibration V in the acoustic portion N may be obtained by analysis such as Finit Element Method (FEM), and thus the position of the partition member 5b in the circumferential direction may be determined such that the exciting force F of the formula (1) described above is 0. A distance between the partition member 5b and the partition member 5a is adjusted in length of the acoustic portion N that is a gap between the partition member 5b and the inlet of the passage R. In addition, between the partition member 5b and the partition member 5a, the side wall portion 2b of the housing 2 or the compartment wall 3 may not be provided under the condition that the acoustic portion N is formed.

In addition, the acoustic damper 1A illustrated in FIG. 5 is described in a form that two acoustic portions N are provided, but two or more acoustic portions N maybe provided, and the position of the partition member 5b of each acoustic portion N may be set to suppress the exciting force F by the plurality of acoustic portions N.

Figure 9:
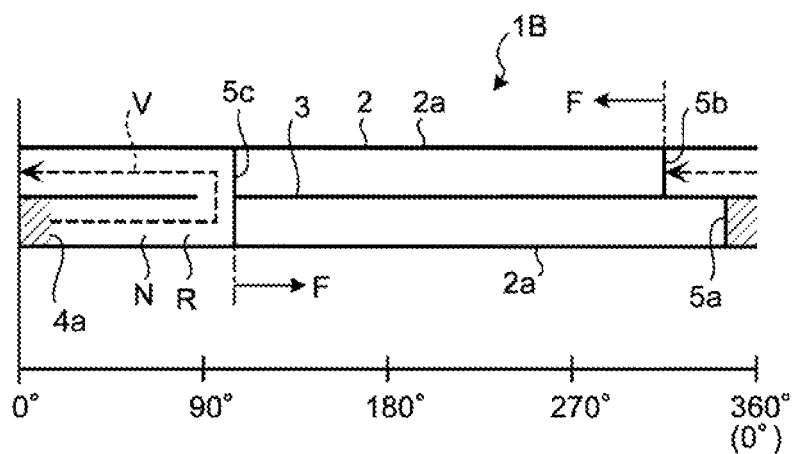
FIG. 9 is a schematic diagram illustrating that another acoustic damper of the embodiment of the invention is developed in the circumferential direction.
Figure 10:
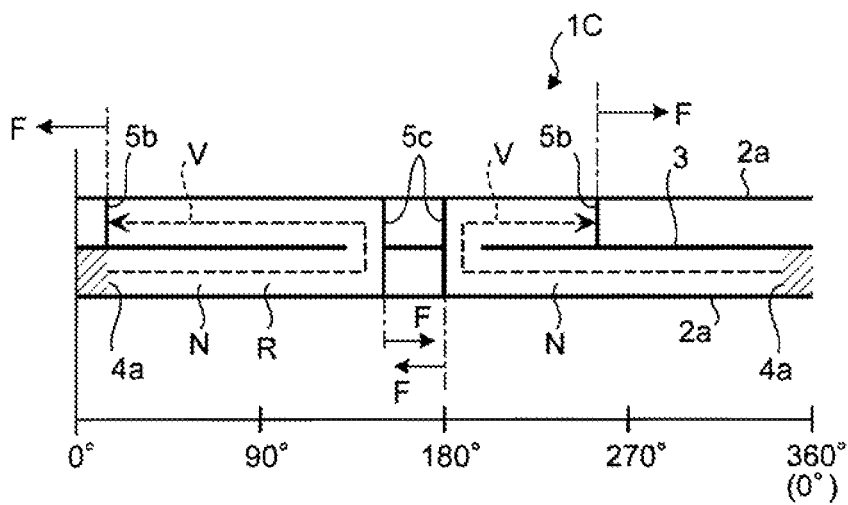
FIG. 10 is a schematic diagram illustrating that another acoustic damper of the embodiment of the invention is developed in the circumferential direction.

FIG. 9 and FIG. 10 are schematic diagrams illustrating that another acoustic damper of the embodiment is developed in the circumferential direction. The acoustic damper 1A illustrated in FIG. 5 is provided with a plurality of acoustic portions N, but an acoustic damper 1B illustrated in FIG. 9 is provided with the acoustic portions N illustrated in FIG. 5 such that the passage R is folded in the reverse direction, and the folded portion is provided with a new partition member 5c and is configured as one passage. Accordingly, in the description of the following acoustic damper 1B, the description of the same configuration as that of the acoustic damper 1A is not repeated.

Specifically, as illustrated in FIG. 9, the acoustic damper 1B is provided with the partition member 5c in the middle of the passage R. The partition member 5c is provided continuously to the adjacent space partitioned by the compartment wall 3. In the passage R, the compartment wall 3 is opened at the portion of the partition member 5c, and is configured by folding with the partition member 5c. The partition member 5b as the end portion of the folded passage R is provided. As a result, the acoustic portion N is configured as one passage from the inlet (the notch 4a) of the passage R to the partition member 5b folded by the partition member 5c.

In the acoustic damper 1B, when the fuel gas flows into the transition piece 33, the air vibration (the pressure wave) V based on the combustion vibration of the combustion gas passes through the through-hole 33a (see FIG. 3) of the transition piece 33 and is received in the housing 2. In the passage R, at the acoustic portion N at the portion between the inlet and the partition member 5c, the air vibration V propagating from the inlet resonates, and the pressure fluctuation in the combustor 12 is reduced. In addition, at the acoustic portion N between the partition member 5c and the partition member 5b, the air vibration V propagating and folded by the partition member 5c resonates, and the pressure fluctuation in the combustor 12 is reduced.

In the acoustic damper 1B, in the acoustic portion N, the propagating direction of the air vibration V is the reverse direction between the inlet and the partition member 5c and between the partition member 5c and the partition member 5b. For this reason, as illustrated in FIG. 9, the exciting force F occurring at the position of the partition member 5c and the exciting force F occurring at the position of the partition member 5b act in the reverse direction to each other. As a result, in the transition piece 33 of the combustor 12, the displacement occurring in the circumferential direction is suppressed.

The positions of the partition member 5c and the partition member 5b in the circumferential direction are a gap between the partition member 5b and the inlet, and determine the length of the acoustic portion N. The length of the acoustic portion N is a distance for reducing the propagating air vibration V, and the distance is determined according to the frequency of the propagating air vibration V. That is, the positions of the partition member 5c and the partition member 5b in the circumferential direction are determined according to the frequency of the air vibration V that is the reducing target. The transfer of the air vibration V and the air vibration V in the acoustic portion N may be obtained by analysis such as Finit Element Method (FEM), thus the positions of the partition member 5c and the partition member 5b in the circumferential direction may be determined such that the exciting force F of the formula (1) described above is 0. A distance between the partition member 5c and the partition member 5a (a distance between the partition member 5c and the partition member 5b) is adjusted in length of the acoustic portion N that is a gap between the partition member 5b and the passage R. In addition, between the partition member 5c and the partition member 5a or between the partition member 5c and the partition member 5b, the side wall portion 2b of the housing 2 or the compartment wall 3 may not be provided under the condition that the acoustic portion N is formed.

In an acoustic damper 1C illustrated in FIG. 10, a plurality of acoustic portions N configured as one passage such as the acoustic damper 1B illustrated in FIG. 9 are disposed.

Specifically, as illustrated in FIG. 10, the acoustic damper 1C does not have the partition member 5a of the acoustic damper 1B. For this reason, the number of passages R is two. The partition member 5c is formed in the middle of each passage R. The partition member 5c is provided continuously to the adjacent space partitioned by the compartment wall 3. In each passage R, the compartment wall 3 is opened at the portion of the partition member 5c, and is configured by folding with the partition member 5c. The partition member 5b as the end portion of the folded passage R is respectively provided. As a result, the acoustic portion N is configured as one passage from the inlet (the notch 4a) of the passage R to the partition member 5b folded by the partition member 5c, and two passages are configured.

In each acoustic damper 1C, when the fuel gas flows in the transition piece 33, the air vibration (the pressure wave) V based on the combustion vibration of the fuel gas passes through the through-hole 33a (see FIG. 3) of the transition piece 33 and is received in the housing 2. In the passage R, at the acoustic portion N at the portion between the inlet and the partition member 5c, the air vibration V propagating from the inlet resonates, and the pressure fluctuation in the combustor 12 is reduced. In addition, at the acoustic portion N between the partition member 5c and the partition member 5b, the air vibration V propagating and folded by the partition member 5c resonates, and the pressure fluctuation in the combustor 12 is reduced.

In the acoustic damper 1C, in each acoustic portion N, the propagating direction of the air vibration V is the reverse direction between the inlet and the partition member 5c and between the partition member 5c and the partition member 5b. For this reason, as illustrated in FIG. 10, in each acoustic portion N, the exciting force F occurring at the positions of the partition member 5c and the exciting force F occurring at the position of the partition member 5b act in the reverse direction to each other. As a result, in the transition piece 33 of the combustor 12, the displacement occurring in the circumferential direction is suppressed.

The positions of the partition member 5c and the partition member 5b in the circumferential direction are a gap between the partition member 5b and the inlet, and determine the length of the acoustic portion N. The length of the acoustic portion N is a distance for reducing the propagating air vibration V, and the distance is determined according to the frequency of the propagating air vibration V. That is, the positions of the partition member 5c and the partition member 5b in the circumferential direction are determined according to the frequency of the air vibration V that is the reducing target. The acoustic damper 1C includes two acoustic portions N, and thus it is possible to reduce the air vibration V according to the frequency of the plurality of air vibration V by changing each length. In addition, when there is a possibility that each air vibration V reduced by each acoustic portion N resonates, the position of the partition member 5b is determined also considering the possibility. The transfer of the air vibration V and the air vibration V in the acoustic portion N may be obtained by analysis such as Finit Element Method (FEM), and thus the positions of the partition member 5c and the partition member 5b in the circumferential direction may be determined such that the exciting force F of the formula (1) described above is 0. A distance between each partition member 5c and each partition member 5b is adjusted in length of the acoustic portion N that is a gap between the partition member 5b and the inlet of the passage R. In addition, between each partition member 5c and each partition member 5b, the side wall portion 2b of the housing 2 or the compartment wall 3 may not be provided under the condition that the acoustic portion N is formed.

In addition, in FIG. 10, the acoustic damper 1C represents one folding of the acoustic portion N, but the folding is not limited to one. Although not illustrated in the drawings, in each acoustic portion, as a plurality of folding, each folded portion may be provided with the partition member 5c.

Figure 11:
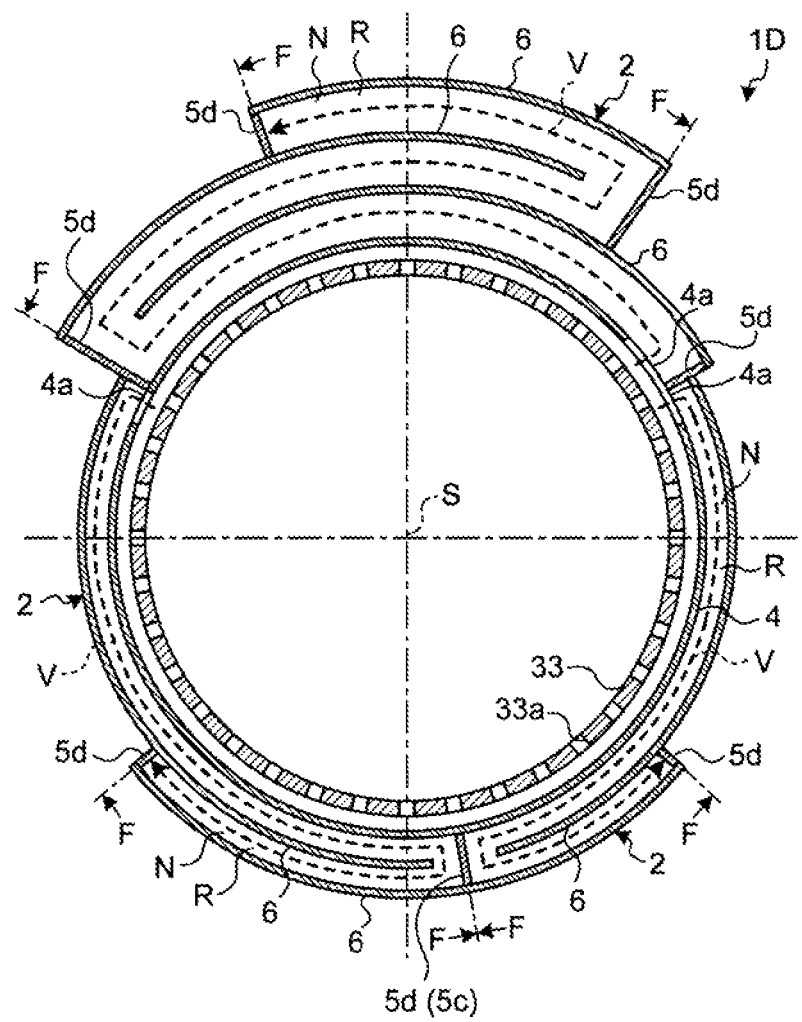
FIG. 11 is a cross-sectional view taken along the line A-A of FIG. 2 and illustrating another acoustic damper of the embodiment of the invention.

FIG. 11 is a cross-sectional view taken along the line A-A of FIG. 2 and illustrating another acoustic damper of the embodiment of the invention. In the acoustic dampers 1A, 1B, and 1C described above, the acoustic portion N is folded in the axial direction of the transition piece 33 that is the extending direction of the combustor axis S, but the acoustic portion N may be folded and provided in the radial direction of the combustor axis S on the outer surface of the transition piece 33, as in an acoustic damper 1D illustrated in FIG. 11.

In the acoustic damper 1D illustrated in FIG. 11, a housing 2 includes an cylindrical outer wall portion 2a (not illustrated) surrounding the outside of the transition piece 33 in the circumferential direction, similarly to the acoustic dampers 1A, 1B, and 1C, a plurality of partition walls 6 are provided on the outside in the radial direction of the partition wall 4 between the outer wall portions 2a, the circumferential direction between the partition wall 4 and the partition wall 6 and between the partition walls 6 is closed by a partition member 5d to form a plurality of spaces overlapped with the radial direction, and each space is configured to form one passage R folded and connected in the radial direction by the partition member 5d. The notch 4a as the inlet of the passage R is provided at the position of the partition member 5d on the inside in the most radial direction of the passage R, to configure the acoustic portion N.

As illustrated in FIG. 11, in the acoustic damper 1D configured as described above, when the fuel gas flows in the transition piece 33, the air vibration (the pressure wave) V based on the combustion vibration of the combustion gas passes through the through-hole 33a of the transition piece 33 and is received in the housing 2. In the passage R, at the acoustic portion N between the inlet thereof and the partition member 5d of the end portion of the passage R, the air vibration V propagating from the inlet resonates, and the pressure fluctuation in the combustor 12 is reduced. In addition, the air vibration folded and propagating by the partition member 5d resonates, and the pressure fluctuation in the combustor 12 is reduced.

In the acoustic damper 1D, in the acoustic portion N, the propagating direction of the air vibration V is the reverse direction between the partition members 5d. For this reason, as illustrated in FIG. 11, the exciting force F occurring at the position of the partition member 5d on one direction side of the circumferential direction and the exciting force F occurring at the position of the partition member 5b on the other direction side of the circumferential direction act in the reverse direction to each other. As a result, in the transition piece 33 of the combustor 12, the displacement occurring in the circumferential direction is suppressed.

The position of the partition member 5d in the circumferential direction is a gap between the partition member 5b of the end portion and the inlet, and determines the length of the acoustic portion N. The length of the acoustic portion N is a distance for reducing the propagating air vibration V, and the distance is determined according to the frequency of the propagating air vibration V. That is, the position in the circumferential direction of the partition member 5d closing the circumferential direction between the partition wall 4 and the partition wall 6 and between the partition walls 6 is determined according to the frequency of the air vibration V that is the reducing target. The transfer of the air vibration V and the air vibration V in the acoustic portion N may be obtained by analysis such as Finit Element Method (FEM), and thus the position of the partition member 5d in the circumferential direction may be determined such that the exciting force F of the formula (1) described above is 0.

In addition, as illustrated in FIG. 11, in the acoustic damper 1D, a plurality (three in the embodiment) of acoustic portions N configured in the same manner are disposed in the circumferential direction. That is, the acoustic damper 1D includes the plurality of acoustic portions N, and thus it is possible to reduce the air vibration V according to the frequency of the plurality of air vibration V by changing each length. In addition, when there is a possibility that each air vibration V reduced by each acoustic portion N resonates, the position of the partition member 5d is determined also considering the possibility.

In addition, as illustrated in FIG. 11, the acoustic damper 1D is provided with the partition member 5c at each folded portion of each passage R in two acoustic portions disposed at the lower portion of FIG. 11.

Figure 12:
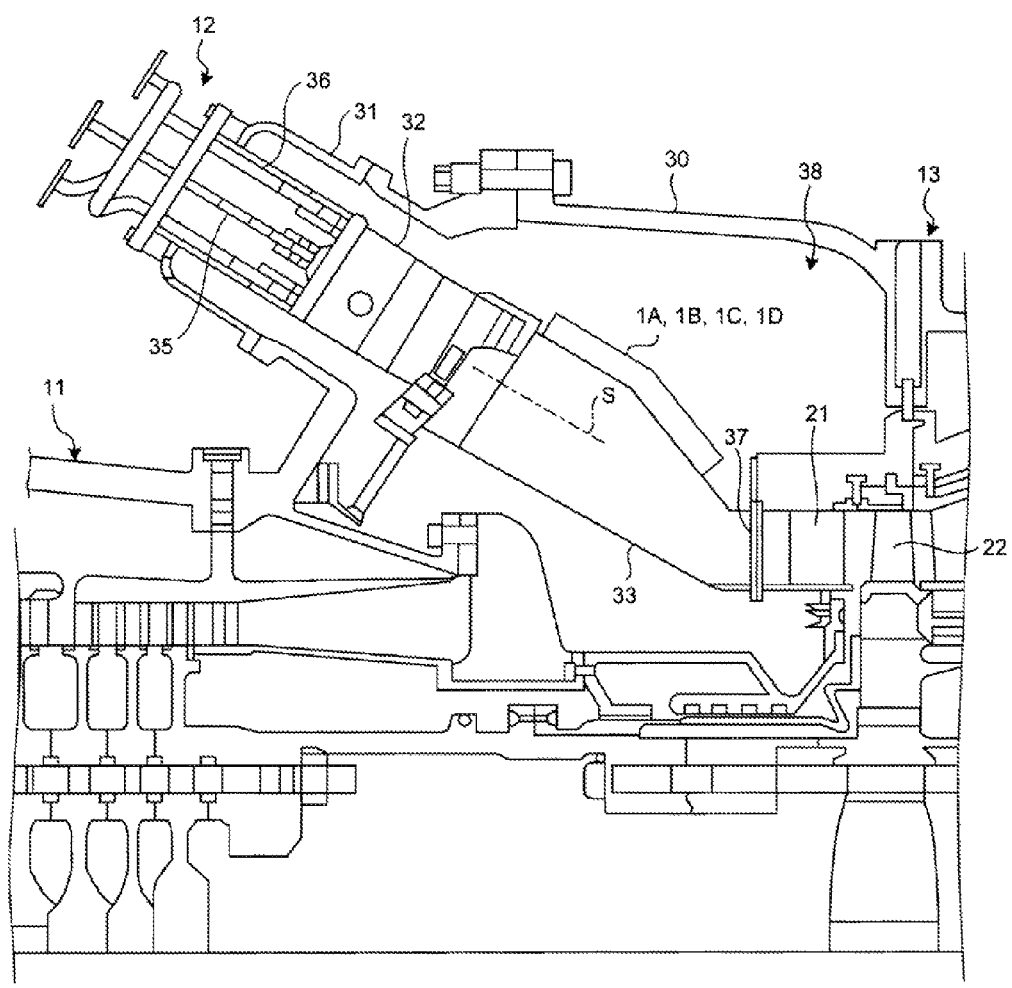
FIG. 12 is a side view of a combustor illustrating another acoustic damper of the embodiment of the invention.

FIG. 12 is a side view of a combustor illustrating another acoustic damper of the embodiment. The acoustic dampers 1A, 1B, 1C, and 1D described above are provided along the circumferential direction of the transition piece 33, but as illustrated in FIG. 12, the acoustic dampers 1A, 1B, 1C, and 1D with the same configuration may be provided along the axial direction of the transition piece 33 that is the extending direction of the combustor axis S on the outer surface of the transition piece 33. According to the acoustic dampers 1A, 1B, 1C, and 1D with the same configuration illustrated in FIG. 12, it is possible to reduce the air vibration V, and to prevent from generating stress in the axial direction with the reducing. In addition, the acoustic dampers 1A, 1B, 1C, and 1D may be provided in the circumferential direction of the transition piece 33 and the axial direction.

As described above, the acoustic dampers (1A, 1B, 1C, and 1D) of the embodiment are fixed to the vibration source (the combustor 12) to be provided along the outer surface of the vibration source, form the passage R that takes in the air vibration V generated by the vibration source, and are provided with the acoustic portion N having the partition members 5b and 5d closing the downstream side of the passage R with respect to the propagation of the air vibration V to serve as resistance against the air vibration V, and the acoustic portion N allows the air vibration V to propagate in the reverse direction, and has the partition members (5b, 5c, and 5d) arranged so as to serve as resistance against the air vibration V in respective directions.

The acoustic dampers (1A, 1B, 1C, and 1D) reduce the pressure fluctuation in the vibration source (the combustor 12) by the acoustic portion N. In addition, the exciting force F generated by collision of the air vibration V to the partition members 5b and 5d when reducing the pressure fluctuation is suppressed with each other by each partition member 5b (5c) and 5d serving as resistance of the air vibration V in the reverse direction, and thus it is possible to prevent from generating stress due to the pressure fluctuation when reducing the vibration. In addition, in the acoustic dampers (1A, 1B, 1C, and 1D), the acoustic portion N is provided along the outer surface of the vibration source, and thus it is possible to configure the acoustic dampers (1A, 1B, 1C, and 1D) in a relatively compact size.

In the acoustic dampers (1B, 1C, and 1D) of the embodiment, the acoustic portion N is provided in which the passage R is folded in the reverse direction, and the partition members 5b, 5c, and 5d are provided at the folded portion and the end portion.

The acoustic dampers (1B, 1C, and 1D) reduce the pressure fluctuation in the vibration source (the combustor 12) by the acoustic portion N. In addition, the exciting force F generated by collision of the air vibration V to the partition members 5b and 5d when reducing the pressure fluctuation is suppressed with each other by each partition member 5b, 5c, and 5d serving as resistance of the air vibration V in the reverse direction, and thus it is possible to prevent from generating stress due to the pressure fluctuation when reducing the vibration. In addition, in the acoustic dampers (1B, 1C, and 1D), the acoustic portion N is provided along the outer surface of the vibration source, the passage R is provided to be folded, and thus it is possible to configure the acoustic dampers (1B, 1C, and 1D) in a relatively compact size.

In addition, in the acoustic dampers (1C and 1D) of the embodiment, a plurality of acoustic portions N configured by folding the passage R are disposed.

The acoustic dampers (1C and 1D) reduce the pressure fluctuation in the vibration source (the combustor 12) by the acoustic portion N. In addition, the exciting force F generated by collision of the air vibration V to the partition members 5b and 5d when reducing the pressure fluctuation is suppressed with each other by each partition member 5b, 5c, and 5d serving as resistance of the air vibration V in the reverse direction, and thus it is possible to prevent from generating stress due to the pressure fluctuation when reducing the vibration. In addition, in the acoustic dampers 1C and 1D, the acoustic portion N is provided along the outer surface of the vibration source, the passage R is provided to be folded, and thus it is possible to configure the acoustic dampers (1C and 1D) in a relatively compact size. In addition, in the acoustic dampers (1C and 1D), the plurality of acoustic portions N are provided, and thus it is possible to reduce the air vibration V according to the plurality of frequencies of the air vibration V.

In the acoustic dampers (1B, 1C, and 1D) of the embodiment, the folding of the passage R is performed a plurality of times, and the partition member 5c is provided at each folded portion.

The acoustic dampers (1B, 1C, and 1D) reduce the pressure fluctuation in the vibration source (the combustor 12) by the acoustic portion N. In addition, the exciting force F generated by collision of the air vibration V to the partition members 5b and 5d when reducing the pressure fluctuation is suppressed with each other by each partition member 5b, 5c, and 5d serving as resistance of the air vibration V in the reverse direction, and thus it is possible to prevent from generating stress due to the pressure fluctuation when reducing the vibration. In addition, in the acoustic dampers (1B, 1C, and 1D), the acoustic portion N is provided along the outer surface of the vibration source, the passage R is provided to be folded, and thus it is possible to configure the acoustic dampers (1B, 1C, and 1D) in a relatively compact size.

In addition, in the combustor 12 of the embodiment, the combustion chamber (the transition piece 33) is provided with any one acoustic damper (1A, 1B, 1C, and 1D) described above, and the air vibration V of the combustion gas flowing in the combustion chamber is allowed to flow in the acoustic damper.

According to the combustor 12, the pressure fluctuation in the combustor 12 based on the combustion vibration is reduced by the acoustic portion N. In addition, the exciting force F generated by collision of the air vibration V to the partition members 5b and 5d when reducing the pressure fluctuation is suppressed with each other by each partition member 5b (5c) and 5d serving as resistance of the air vibration V in the reverse direction, and thus it is possible to prevent from generating stress on the combustor 12 due to the pressure fluctuation when reducing the vibration. In addition, in the combustor 12, the acoustic portion N is provided along the outer surface of the combustion chamber, and thus it is possible to configure the combustor 12 in a relatively compact size.

In addition, in the combustor 12 of the embodiment, the passage R is disposed along the circumferential direction of the combustion chamber (the transition piece 33).

According to the combustor 12, it is possible to prevent generation of vibration displaced in the circumferential direction of the combustion chamber (the transition piece 33).

In addition, in the combustor 12 of the embodiment, the passage R is disposed along the axial direction of the combustion chamber (the transition piece 33).

According to the combustor 12, it is possible to prevent generation of vibration displaced in the axial direction of the combustion chamber (the transition piece 33).

The gas turbine of the embodiment is provided with any one combustor 12 described above.

According to the gas turbine, the combustion vibration occurring in the combustor 12 is reduced by the acoustic portion N. For this reason, it is possible to reduce noise or vibration when driving the gas turbine. In addition, the exciting force F generated by collision of the air vibration V to the partition members 5b and 5d when reducing the pressure fluctuation is suppressed with each other by each partition member 5b (5c) and 5d serving as resistance of the air vibration V in the reverse direction, generation of stress on the combustor 12 due to the pressure fluctuation when reducing the vibration is prevented, and thus it is possible to prevent from generating stress on the gas turbine. In addition, in the gas turbine, the acoustic portion N is provided along the outer surface of the combustion chamber (the transition piece 33), and it is possible to configure the gas turbine in a relatively compact size, with the combustor 12.

REFERENCE SIGNS LIST 1A, 1B, 1C, 1D ACOUSTIC DAMPER
2 HOUSING
2a OUTER WALL PORTION
2b SIDE WALL PORTION
3 COMPARTMENT WALL
4, 6 PARTITION WALL
4a NOTCH
5a, 5b, 5c, 5d PARTITION MEMBER
12 COMBUSTOR
33 TRANSITION PIECE (COMBUSTION CHAMBER)
33a THROUGH-HOLE
37 GUSSET
37a FRAME PORTION
37b SUPPORT PIECE
F EXCITING FORCE
M ACOUSTIC PORTION
R PASSAGE
S COMBUSTOR AXIS
V AIR VIBRATION

The invention claimed is:

1. An acoustic damper fixed to a vibration source along an outer surface of a vibration source which generates air vibration,
the acoustic damper comprising:
a housing for surrounding a part of the outer surface;
a compartment wall for partitioning space of the housing;
a partition wall for defining at least two adjacent passages with the housing and the compartment wall, the partition wall being provided along the outer surface in the housing, wherein each of the at least two adjacent passages communicates with the vibration source and take in the air vibration; and
at least two partition members respectively provided for the at least two adjacent passages each of which closes the downstream side of the passage with respect to the propagation of the air vibration to serve as resistance against the air vibration,
wherein directions from an inlet to the at least two partition members are opposed to each other for the at least two adjacent passages, the inlet being communicating to the vibration source.

2. A combustor in which a combustion chamber is provided with the acoustic damper according to claim 1 and air vibration of combustion gas flowing in the combustion chamber is allowed to flow in the acoustic damper.

3. The combustor according to claim 2, wherein longitudinal directions of the at least two adjacent passages are along a circumferential direction of the combustion chamber.

4. The combustor according to claim 2, wherein longitudinal directions of the at least two adjacent passages are along an axial direction of the combustion chamber.

5. A gas turbine comprising the combustor according to claim 2.

6. An acoustic damper fixed to a vibration source along an outer surface of the vibration source which generates air vibration, the acoustic damper comprising:

a housing for surrounding a part of the outer surface;

a compartment wall for partially partitioning space of the housing;

a partition wall for defining at least two passages with the housing and the compartment wall, the partition wall being provided along the outer surface in the housing, wherein each of the at least two passages communicates with the vibration source and take in the air vibration;

at least two first partition members provided for the at least two passages, each of which closes the downstream side of the passage with respect to the propagation of the air vibration to serve as resistance against the air vibration;

at least two second partition members for separating the at least two passages and for respectively folding the at least two passages via the compartment wall along the outer surface, wherein directions from an inlet to the second partition member are opposed to each other for the at least two adjacent passages, the inlet being communicating to the vibration source.

7. A combustor in which a combustion chamber is provided with the acoustic damper according to claim 6 and air vibration of combustion gas flowing in the combustion chamber is allowed to flow in the acoustic damper acoustic damper.

8. The combustor according to claim 7, wherein longitudinal directions of the at least two adjacent passages are along a circumferential direction of the combustion chamber.

9. The combustor according to claim 2, wherein longitudinal directions of the at least two adjacent passages are along an axial direction of the combustion chamber.

10. A gas turbine comprising the combustor according to claim 7.

* * * * *